(12) United States Patent
Basham et al.

(10) Patent No.: US 9,964,463 B2
(45) Date of Patent: May 8, 2018

(54) VARIABLE LOAD AND LOAD VECTOR APPLICATION SYSTEM

(71) Applicant: The Boeing Company, Chicago, IL (US)

(72) Inventors: Richard Basham, Kent, WA (US); Tom Rogers, Issaquah, WA (US); Trevor Brightwell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/073,260

(22) Filed: Mar. 17, 2016

(65) Prior Publication Data

US 2017/0268958 A1 Sep. 21, 2017

(51) Int. Cl.
*G01M 5/00* (2006.01)
*G01M 99/00* (2011.01)

(52) U.S. Cl.
CPC ............ *G01M 5/005* (2013.01); *G01M 99/00* (2013.01)

(58) Field of Classification Search
CPC .............................. G01M 5/005; G01M 99/00

USPC ........................................................... 73/802
See application file for complete search history.

(56) References Cited

U.S. PATENT DOCUMENTS

| 9,645,064 B1* | 5/2017 | Alam ..................... G01N 3/30 |
| 2013/0152750 A1* | 6/2013 | Chilcott ............... B26D 7/2635 83/56 |
| 2015/0059488 A1* | 3/2015 | Chang .................... G01N 19/04 73/794 |
| 2015/0276778 A1* | 10/2015 | Riether .................. G01N 35/04 187/250 |
| 2016/0153866 A1* | 6/2016 | Straeten ........... G01M 17/0078 73/12.04 |

* cited by examiner

*Primary Examiner* — Max Noori
(74) *Attorney, Agent, or Firm* — Miller, Matthias & Hull LLP

(57) ABSTRACT

An article under test, such as a wing or other aerodynamic component of an aircraft, is load tested by applying a desired load at a desired angle. When a change in attitude of the article under test is determined, a position of a load mechanism that provides the load to the article under test is changed in real time to maintain the desired angle. The load may also be dynamically adjusted according to the position of the article under test.

16 Claims, 10 Drawing Sheets

VARIABLE LOAD AND LOAD VECTOR APPLICATION SYSTEM

FIELD

This disclosure relates generally to structural testing and more particularly to load testing in aircraft components.

BACKGROUND

Components used in transportation vehicles must be tested to ensure that their design and construction are safe for operation in their expected operating environment. This often involves applying physical loads to structures that are well above the expected loads in actual use. During testing of structures that have limited movement, a load can be applied at a desired angle, such as normal to a surface. Even if the surface angle changes slightly during testing, the change in angle of the load may be ignored. Some larger changes in position of the article under test may be handled by moving the load source farther from the unit under test to minimize the angular change of the point load. However, testing structural components that are actively moved during operation, such as wing flaps and spoilers, present a problem for maintaining a correct load angle during testing.

SUMMARY

In an aspect of the disclosure, a test rig includes a cart moveable in relation to an article under test, a load mechanism coupled to the cart that provides a load that is programmatically adjustable and applied via a controller to the article under test. The controller coordinates the real time movement of the cart with movement of the article under test to maintain a desired load angle between the load mechanism and the article under test.

In another aspect of the disclosure, a method of providing a load to an article under test includes determining a change in attitude of the article under test and, responsive to the change in attitude of the article under test, adjusting in real time a position of a load mechanism that provides the load to the article under test.

In yet another aspect of the disclosure, a test rig that provides a load to an article under test includes a track having a longitudinal direction generally perpendicular to an axis of rotation of the article under test, a cart moveable along a variable profile track and a load mechanism coupled to the cart, the load mechanism responsive to instructions to provide the load to the article under test. The test rig also includes a drive mechanism that moves the cart along the track responsive to instructions to movement of the article under test and a controller that determines an attitude of the article under test and sends instructions to the load mechanism and the drive mechanism to adjust the load and a position of the cart, respectively.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
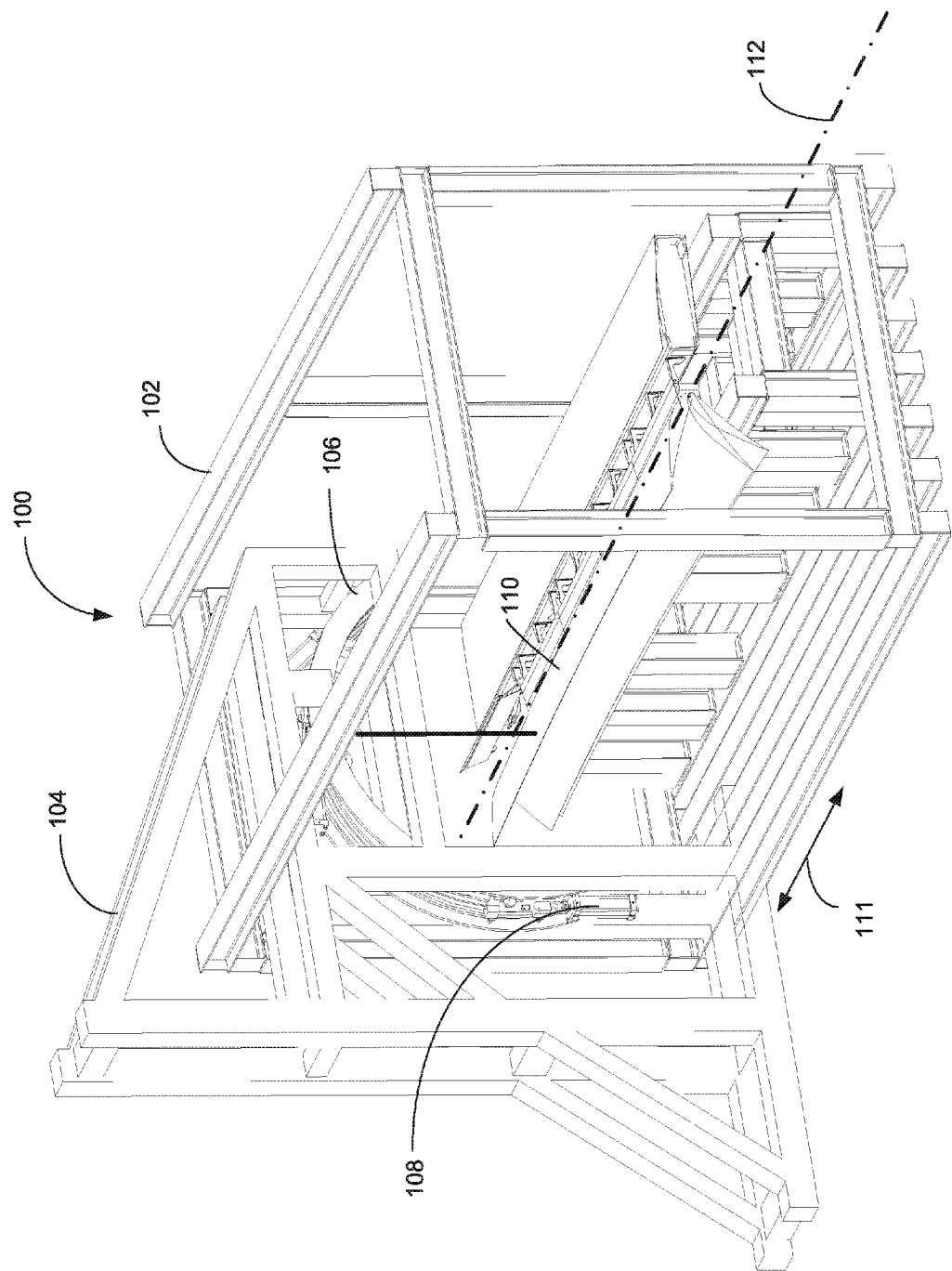
FIG. 1 is a perspective view illustrating a test rig in accordance with the current disclosure.

FIG. 1 illustrates a test rig 100 that, in an embodiment is used to provide a load to an article under test 110. Test rig includes a frame 102 and a support stand 104 that is either rigidly attached to the frame 102 or, in an embodiment, may be translatable in a direction 111 along a width of the frame 102. Attached to the support stand 104 is a track 106 that supports a cart 108. The cart 108 is movable along the track 106. The support stand 104 and track 106 must be capable of supporting the load forces applied during testing. The article under test 110 may be an entire component to be tested or may be a portion of a larger assembly. FIG. 1 depicts the article under test 110 to be a flap of an airplane wing. An axis of rotation 112 of the article under test 110 will be discussed in more detail below. In various embodiments, the test rig 100 may include multiple support stands and tracks, limited in number only by the amount of space between ends of the frame 102.

In actual use on an airplane in flight, the illustrated article under test 110, that is, the flap, may be deployed relatively quickly from a retracted position generally on-plane with the rest of the wing to fully deployed at an angle of 45° or more. Other components that may be tested include, for example, a spoiler that may be deployed very rapidly. A spoiler may be deployed just after landing when it is desirable to rapidly reduce the lift capacity of the wing. During such operations, wing flaps and spoilers may be subjected to rapidly changing loads as each travels from retracted to fully deployed.

Static testing of such a component at discrete angles provides some useful data about expected performance and safety margins. However, the ability to continuously apply a load to the article under test at an appropriate angle over its full range of motion in real time and to also vary the load in real time during a simulated deployment provides a more real-world test of the structure including surfaces, actuators, and hinges.

Other components that move during operation can also benefit from the ability to change in real time both load magnitude and load angle during testing. The components include, but are not limited to trim tabs, ailerons, and landing gears. However, many other components that are more or less static, such as wings, may benefit from testing using varying load angles and magnitudes to simulate various conditions during flight. Even though static testing may achieve acceptable test results in these latter case, the dramatic improvement in speed provided by the test rig 100 over one-at-a-time load positioning represents a significant benefit to developers and test operators.

Figure 2:
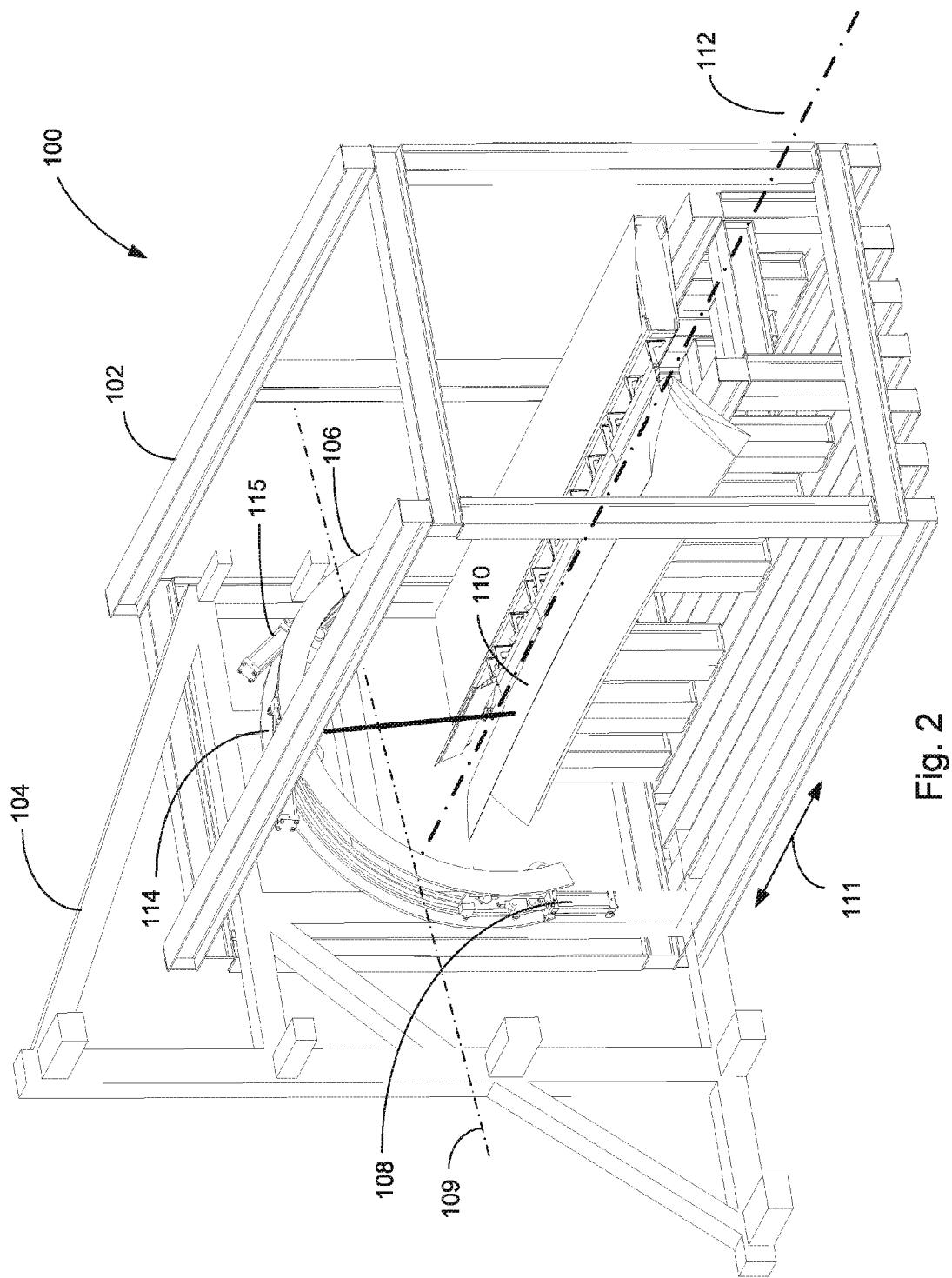
FIG. 2 is another perspective view of the test rig of FIG. 1 with some elements removed for better visibility.

Turning to FIG. 2, the test rig 100 of FIG. 1 is illustrated with the support stand 104 partially removed for better visualization of the track 106. In the illustrated embodiment, the track 106 is an arc of a circle. In some embodiments, the center of the circle is located at the axis of rotation 112 of the article under test 110. Generally, the track 106 in this shape allows the cart 108 to maintain a position that is generally normal to the article under test 110 as it moves about the axis of rotation 112 and minimizes distance changes between the cart 108 and the article under test 110. The term generally normal, or simply, normal, is understood to be perpendicular to the axis of rotation 112 and/or perpendicular to a surface to which the load is attached, within the tolerances of the test rig 100 and such that the needs of the test protocol for application of the load are met. In some circumstances, the application may require that the load angle remain within a few degrees of perpendicular, whereas in other applications, a variation of ten degrees or more may be sufficient. In other embodiments, the track 106 can be a more complex curve in order to more closely match components whose movement is not simply rotational but includes both translation as well as rotation. An example is the course of an aft wing flap or leading edge flap which both translate and rotate relative to a main wing body. This alternative is discussed more below with respect to FIG. 8. A longitudinal direction 109 of the track 106 is generally perpendicular to the axis of rotation 112 of the article under test. As above, the term generally perpendicular, or simply, perpendicular, in this respect is understood to be within the tolerances of the test rig 100 and track 106 and such that the needs of the test protocol for a particular article under test are met.

Further, a profile of the track 106 does not need to be limited to an arc. The profile can be adjusted to match the path of motion of the component being tested. There are advantages to having a track profile that matches the path of the component being tested. Briefly, by minimizing the distance variations between cart 108 and the article under test 110, the weight of the cart 108 can be kept low and the cart 108 can be moved faster, improving testing capabilities. More specifically, by keeping the variation in distance between the article under test 110 and the cart 108 to a minimum, the change in length of the cable 118 or rod 136 is also minimized. This allows the amount of adjustment required by the tensioner 120 to be minimized, thereby reducing the size and weight of the tensioner 120. When the size and weight of the tensioner 120 are kept low, the size and weight of the drive mechanism 125 can also be kept low. When the overall momentum of the cart 108 is minimized, the cart 108 may be driven at a higher speed, which increases the versatility of the test rig 100.

In some embodiments, a second cart 114 or even a third cart 115 is used on the same track 106 in order to provide additional loads to the article under test 110, or to other components mounted in the test rig 100.

Figure 3:
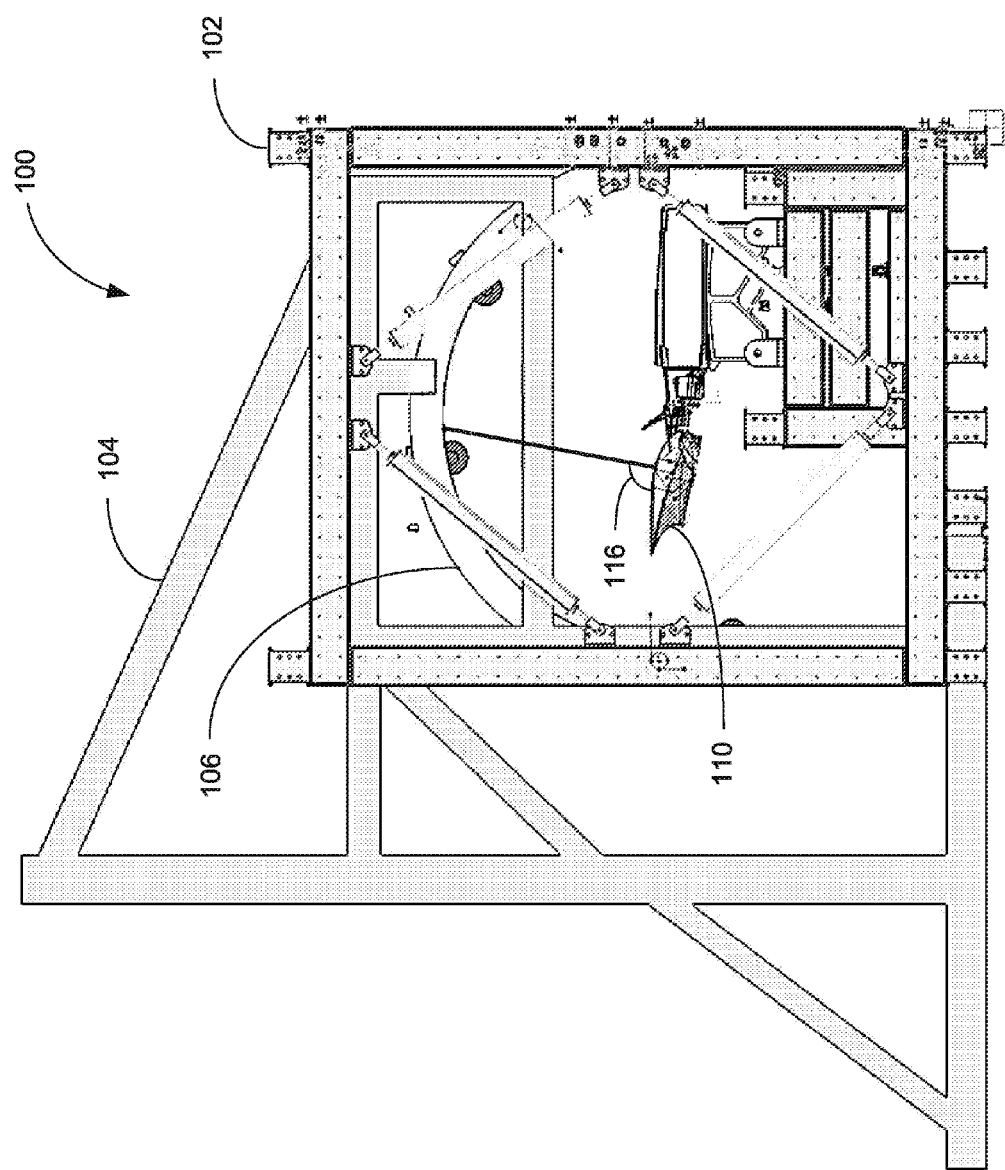
FIG. 3 is a side view of the test rig of FIG. 1.

A side view of the test rig 100 is illustrated in FIG. 3. As seen in this view, an angle 116 is formed between the article under test 110 and a cable 118 attached between the cart 108 and the article under test 110. A benefit of a cable 118 for load application is that the force applied is always collinear with the cable 118, and in that respect is easy to predict when a position of the cart 108 is known. In an alternate embodiment discussed below, the cable 118 providing a tension load may be replaced by a rod providing a compression load.

Figure 4:
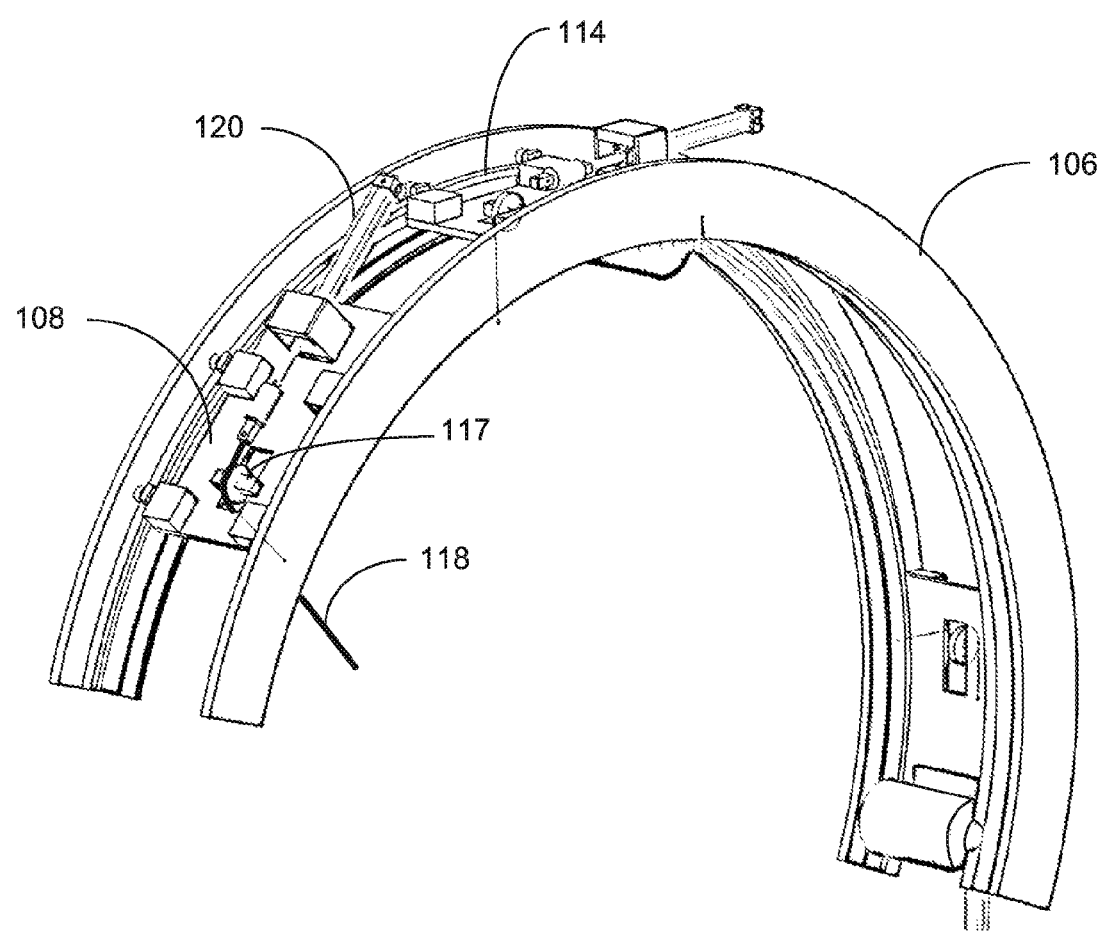
FIG. 4 is a perspective view of a track and carts of the test rig.

FIG. 4 shows the track 106, cart 108, and cart 114 in more detail. In an embodiment, the cart 108 includes a pulley 117 over which the cable 118 runs with a load on the cable 118 provided by a tensioner 120. The tensioner 120 may be an adjustable tensioner comprising any of a number of devices that can produce a variable force including, but not limited to, a winch, a ball screw and jack, or a hydraulic cylinder. The tensioner 120, cable 118, pulley 117 may be referred to as a load mechanism 158.

Figure 5:
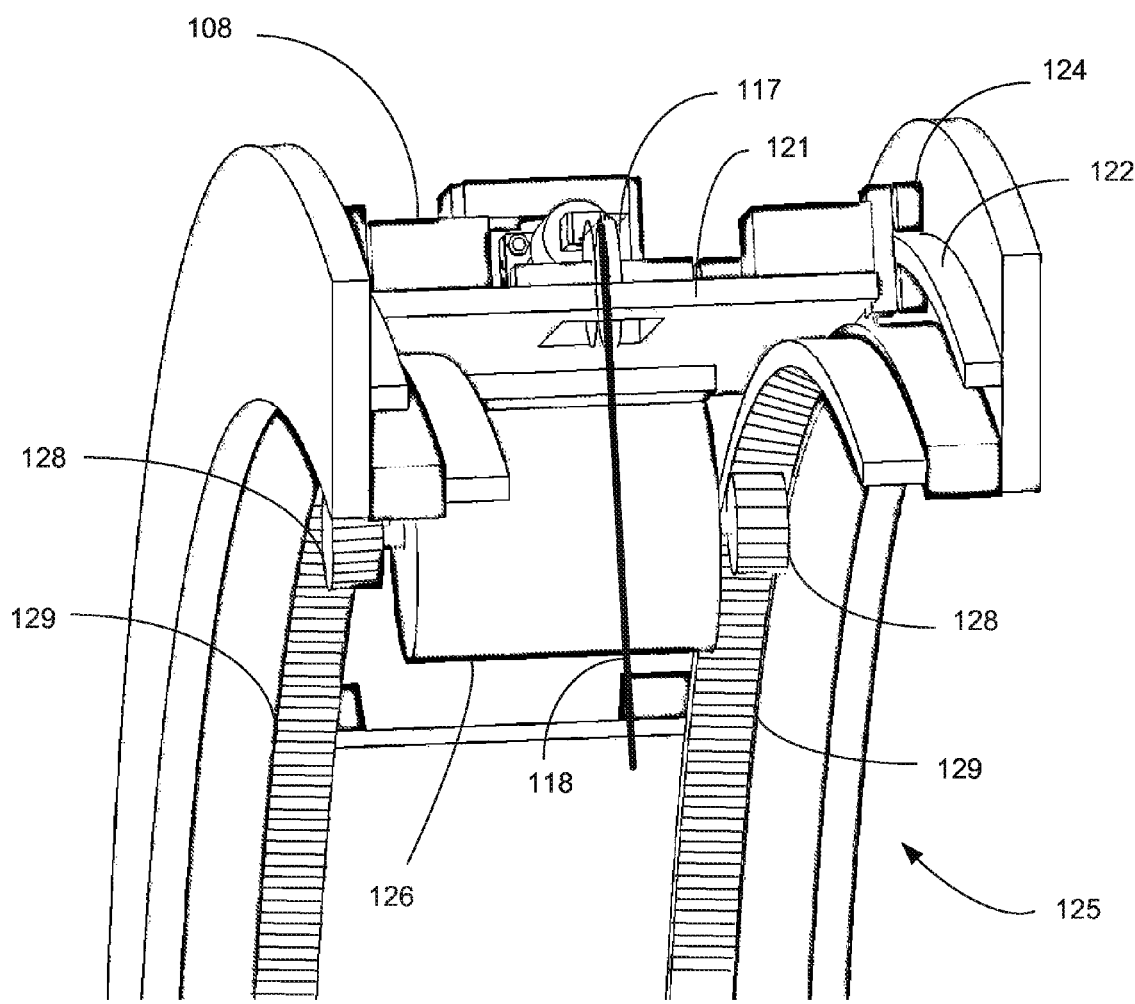
FIG. 5 is a perspective view detail of the track and cart.

Additional details of one embodiment of a cart 108 are shown in FIG. 5. In the illustrated embodiment, the cart 108 rides on rails 122 using rollers 124 for support. A drive mechanism 125 may include a motor 126 coupled to pinion gears 128 that drive the cart 108 along a rack 129. The rack and pinion drive provides positive traction and allows accurate positioning of the cart 108 because there is no slip during drive operations. In an embodiment, it is expected that the cart may move at speeds of 60 inches per second or more. For those components that include more complex motion, the cart 108, the load mechanism, or both may be moved laterally, for example, using a linear table 121. The linear table 121 allows the cart 108 and/or the load mechanism 158 to be moved so that the load angle can to be adjusted laterally, that is, perpendicular to the longitudinal direction 109 of the track, providing two directions of motion, or degrees of freedom to adjust the angle of the load. That is, while the cart 108 may be moved along the track 106, the cart 108 or the load mechanism 158 can be moved independently orthogonal to the track 106. Alternatively, or in addition to this lateral translation, the entire support stand 104 and track 106 can be oriented to match a complex path of motion of an article under test 110. As discussed above, in some embodiments, the entire support stand 104 can be moved laterally, in direction 111, that is, along the direction of the axis of rotation 112 relative to the frame 102.

Figure 6:
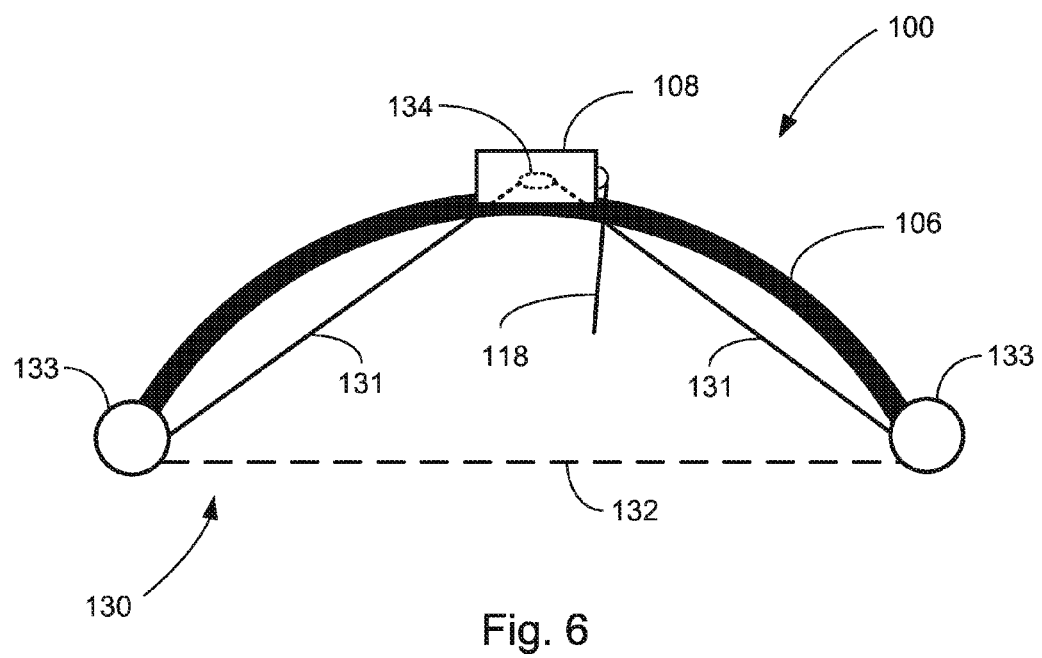
FIG. 6 is an illustration of an alternate embodiment of a drive mechanism for the cart.

Other forms of moving the cart 108 are discussed with respect to FIG. 6. Turning to FIG. 6, the track 106 is shown in side view. In this embodiment, the cart 108 is moved by an alternate drive mechanism. The drive mechanism 130 uses a wire 131 or chain 132 and one or more motors 133. In an embodiment using a wire 131, the cart 108 is attached at a bracket 134 and moved by winding and unwinding the wire 131, respectively, at opposite motors 133. In one embodiment using a chain, the chain 132 is placed in a loop that starts and ends at the bracket 134. The drive motors 133 turn in the same way in one direction or the other to move the cart 108 along the track 106. Similar to the rack and pinion drive shown in FIG. 5, either the wire drive or chain drive alternatives provide a positive response when a change in position of the cart 108 is required.

Figure 7:
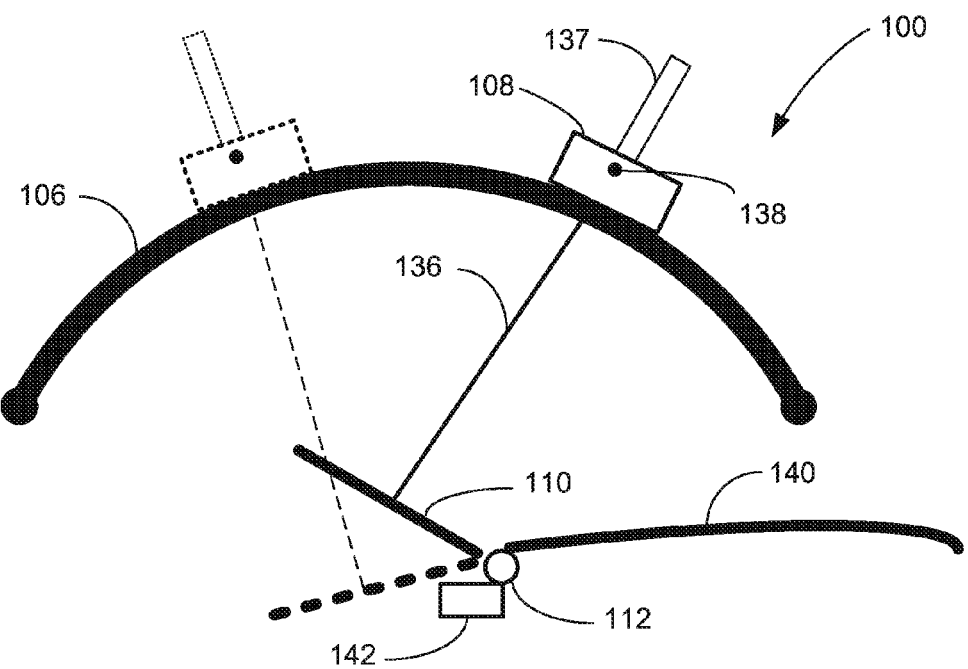
FIG. 7 is an illustration of an alternate embodiment of a load mechanism.

FIG. 7 illustrates another embodiment of the test rig 100 that provides either a tension load or a compression load to the surface under test 110. In this embodiment, a rod 136 is coupled to a compression device 137 that applies a selectable pressure or tension to the article under test 110. The compression device 137 may be a ball and screw drive, a hydraulic cylinder or other similar device. Because the rod 136 and compression device 137 are more or less rigid, in order to accommodate changes in the angle of the cart 108 to the article under test 110, the compression device 137 may be mounted to the cart 108 using a pivot 138. That is, even though the rod 136 may be at a desired angle to the article under test 110, the angle of the rod with respect to the cart 108 may change. Mounting the compression device 137 at the pivot 138 accommodates these angular variations.

Also illustrated in FIG. 7 is a sensor 142 that determines a position of the article under test 110. In embodiments incorporating this technology, the sensor 142 is attached at the axis of rotation 112 and either reports a position relative to the frame 102 or reports the position relative to a fixed structure 140 such as a wing. The sensor 142 may be a rotary sensor attached to either the article under test 110 or a shaft (not depicted) on which the article under test 110 rotates. Alternatively, the sensor 142 may be part of the equipment being tested, that is, the sensor 142 may be a sensor that would be deployed on a production aircraft. Because the sensor reports an angle, or alternatively, a position of an actuator, and not the actual attitude of the article under test 110, an algorithm may be required to translate the sensor reading to an actual position or attitude of the article under test 110.

Figure 8:
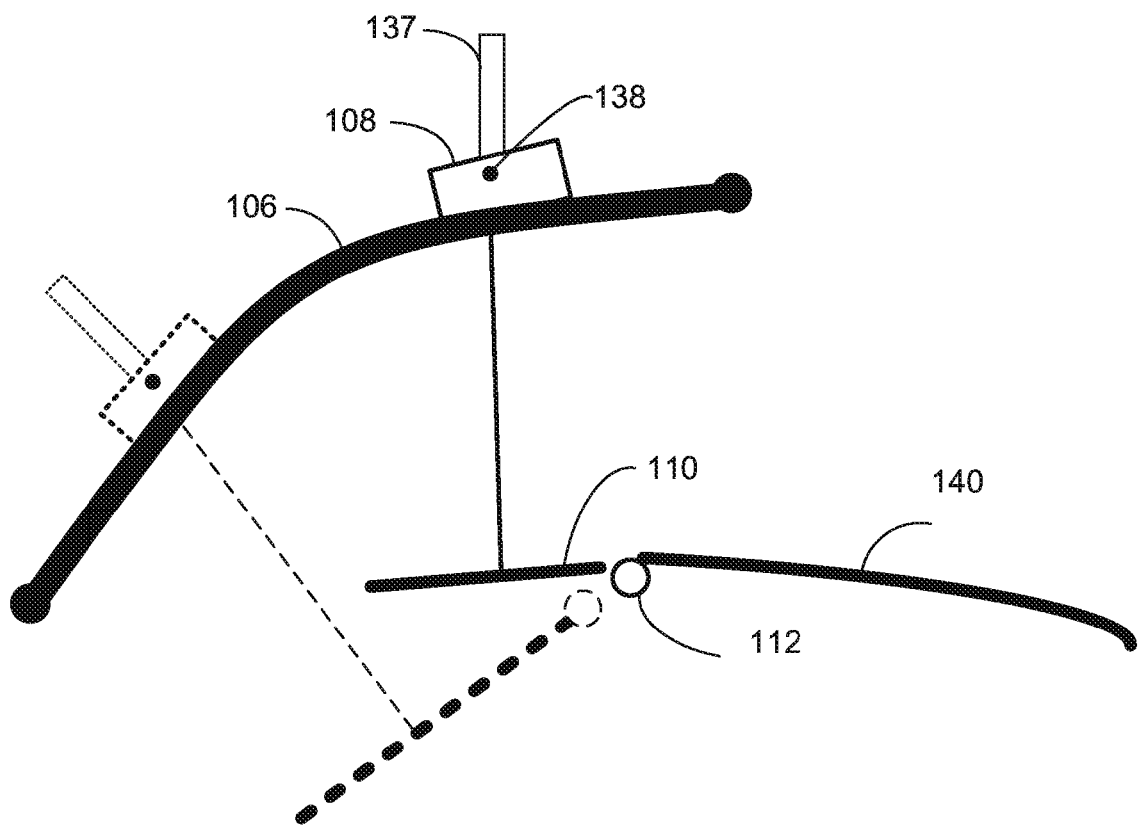
FIG. 8 is an illustration of an alternate embodiment of a track.

As discussed above, in some embodiments, the track is a more a complex shape in both lateral and vertical directions. An alternate embodiment of a track 106 showing such complexity in the vertical direction is illustrated in FIG. 8. In this embodiment, the track 106 is not a smooth geometric shape, such as an arc illustrated in FIG. 7 above but rather is shaped to follow the nonlinear path of the article under test 110, or, in an embodiment, to keep the distance between the cart 108 and the article under test 110 relatively constant. Complex track shapes, as discussed above, can lead to reduced cart weight and better agility of the overall test rig 100.

Figure 9:
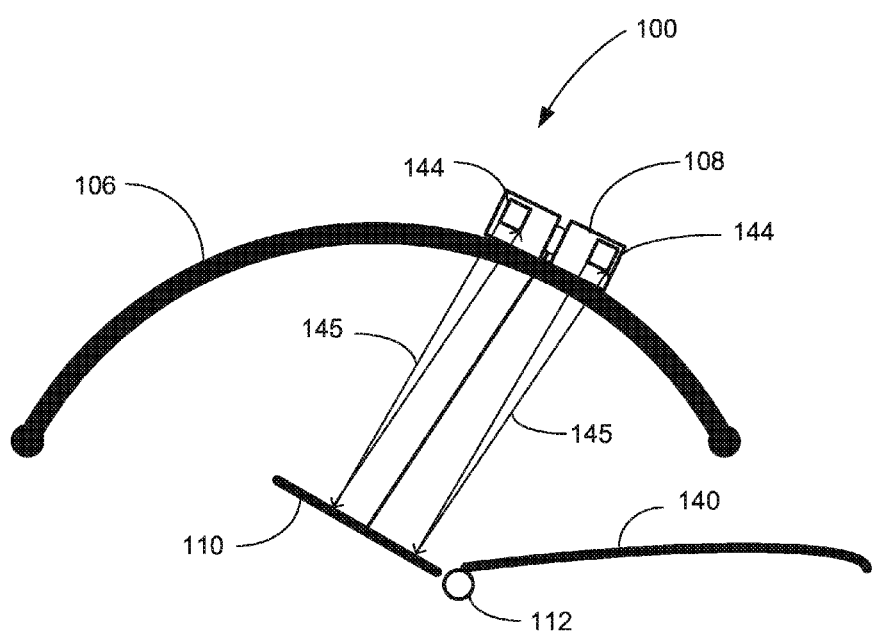
FIG. 9 is an illustration of an alternate device for determining an attitude of an article under test.

FIG. 9 is an illustration of an alternate embodiment of the test rig 100 that uses one or more optical sensors 144, such as LIDAR sensors, to determine an attitude of the article under test 110 by measuring separate points on the article under test 110 with one or more laser beams 145. This embodiment allows the cart 108 to operate independently of the article under test 110, that is, there is no dependence on sensors 142 or equipment position sensors used in other embodiments to mechanically measure the attitude of the article under test 110.

Figure 10:
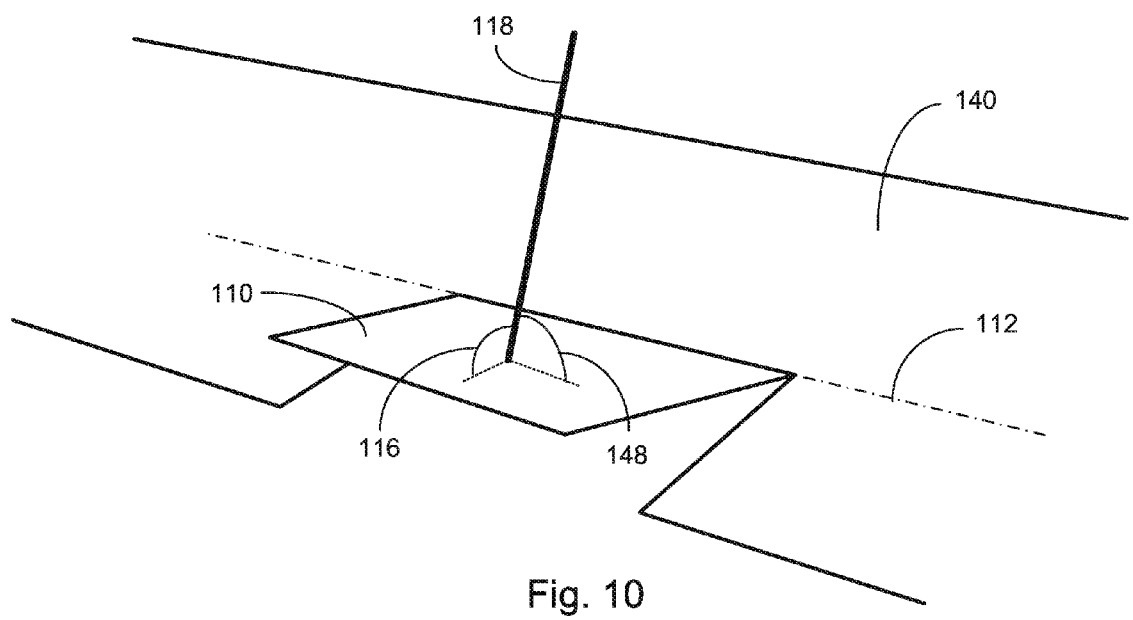
FIG. 10 is a perspective view of an article under test showing load angles.

The load angle between the article under test 110 and the cable 118 (or rod 136, in the case of the embodiment of FIG. 7) is illustrated in FIG. 10. An angle 116 is measured in a plane perpendicular to the axis of rotation 112 and a lateral angle 148 is measured in a plane parallel to the axis of rotation 112. As part of the feedback control of the cart 108, discussed in more detail below, the measured or calculated angle 116 is used to determine when and how much to move the cart 108. While it is anticipated that there is an ability to respond more rapidly to changes relative to angle 116, there is also an ability to adjust or maintain angle 148 through lateral translation of the support stand 104.

Figure 11:
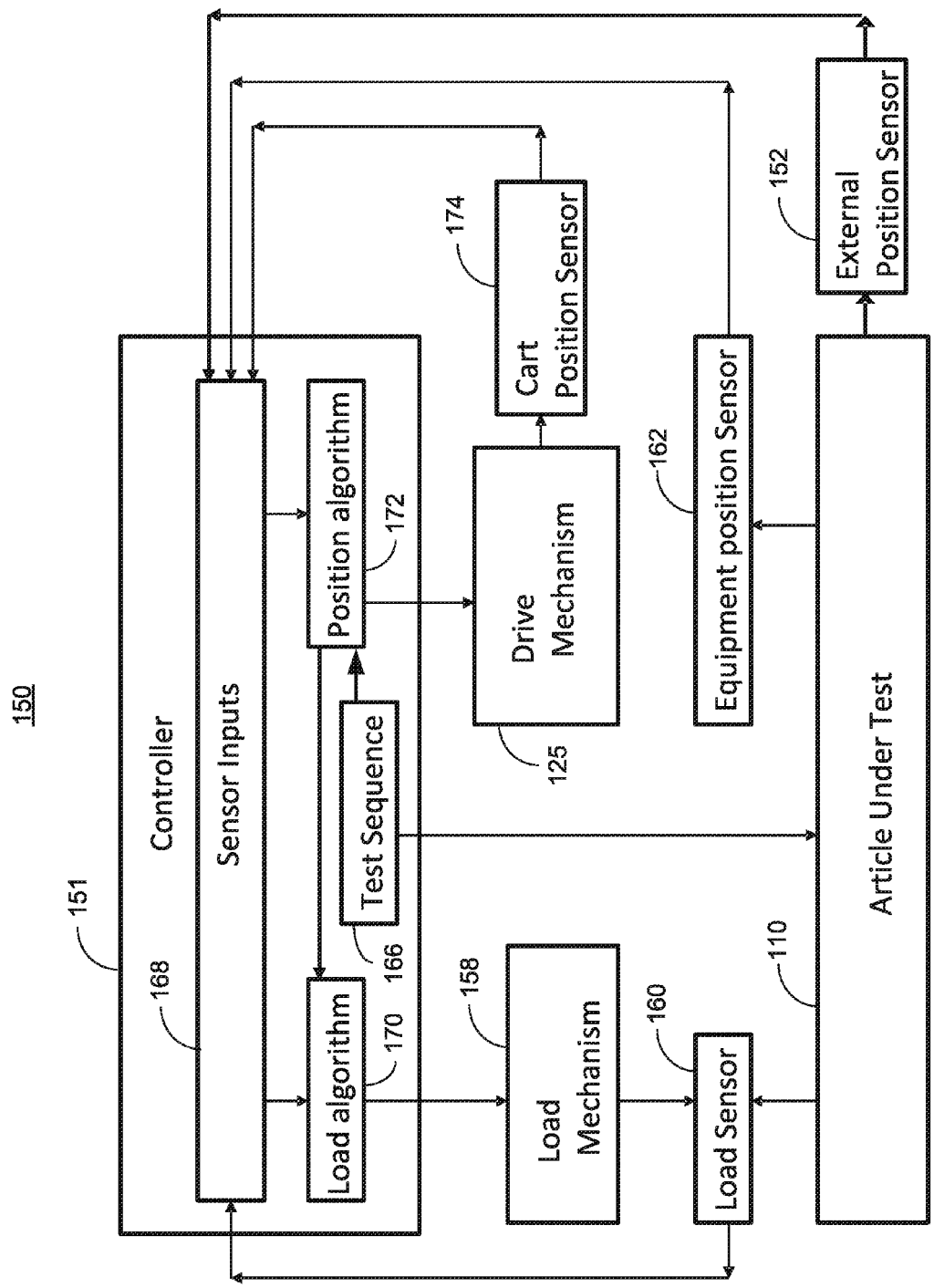
FIG. 11 is a block diagram of a control system for the test rig of FIG. 1.

A block diagram of a control system 150 suitable for use with the test rig 100 is illustrated in FIG. 11. The ability to maintain the cable 118 or rod 136 at a desired angle is a direct function of the ability to move the cart 108 as the article under test 110 is moved. Similarly, the load profile, or desired load, may change as the article under test 110 moves, simulating actual use conditions. As well, it would be expected that the distance between the cart 108 and the article under test 110 may vary as the cart 108 moves. This requires further real time adjustments to the load to maintain the desired load profile, even if the desired load is constant over the range of motion of the article under test 110.

The controller 151 may have a variety of inputs and outputs to receive information about the environment and maintain the desired angle and load. In various embodiments, sensor inputs 168 collect data from a variety of sensors, such as, but not limited to, a cart position sensor 174, a load sensor 160 and either or both of an equipment position sensor 162 or an external sensor 152. The external position sensor 152, the same as or similar to sensor 142, is used to report information relative to an attitude of the article under test 110, such as an angle of a shaft at the axis of rotation 112. Alternatively, or in addition to the previous information, the equipment position sensor 162, provides the same information that would be provided in flight, such as a position of an actuator (not depicted). Data from these position sensors 152 and/or 162 is used by a position algorithm 172 to determine an attitude of the article under test 110 relative to either a fixed structure 140 or the frame 102 of the test rig 100.

The load sensor 160 provides data to the load algorithm 170 that is used to adjust in real time a magnitude of the force applied to the article under test 110. The load sensor 160 provides information corresponding to the amount of force applied to the article under test 110 by the cable 118 or rod 136. The load sensor 160 may be a strain gauge mounted to the tensioner 120 or compression device 137. In other embodiments, the load sensor 160 is part of the load mechanism 158, for example, a torque sensor when the tensioner 120 is a motor that tensions the cable 118.

Similarly, a location sensor 159 or the drive mechanism 125, 130 itself may provide information to the controller 151 relative to the location of the cart 108 using, for example, optical marks or Hall effect sensors. Alternatively, the controller 151 may maintain the location of the cart 108 by accounting for commands used to move the cart 108 during the course of a test. For example, when the drive mechanism 125, 130 uses a stepper motor, the controller 151 can simply translate the motion commands sent to the drive mechanism 125 into a position of the cart 108.

The position algorithm 172 may also be used to determine a position of the cart 108 based on information from the drive mechanism 125 or other sensors as discussed above. Because the position algorithm 172 has knowledge of both the position of the article under test 110 and the cart 108, and, in some embodiments, a priori information from a test sequence 166, the position algorithm 172 can adjust the location of the cart 108 and the load provided to the article under test 110. The adjustments in load may result from known changes in the distance between the cart 108 and the article under test 110 as well as changes required by the test sequence that simulate operating conditions.

In some embodiments, the controller 151 also includes the test sequence 166 that either manages or can be synchronized to other physical elements of the test so that the cart movement does not necessarily have to be reactive to movement of the article under test 110 but can be moved in a coordinated fashion as the test sequence is carried out. For example, the controller 151 may also be in control of movement of the article under test 110, so that the cart movement can be synchronized to the movement of the article under test 110.

Figure 12:
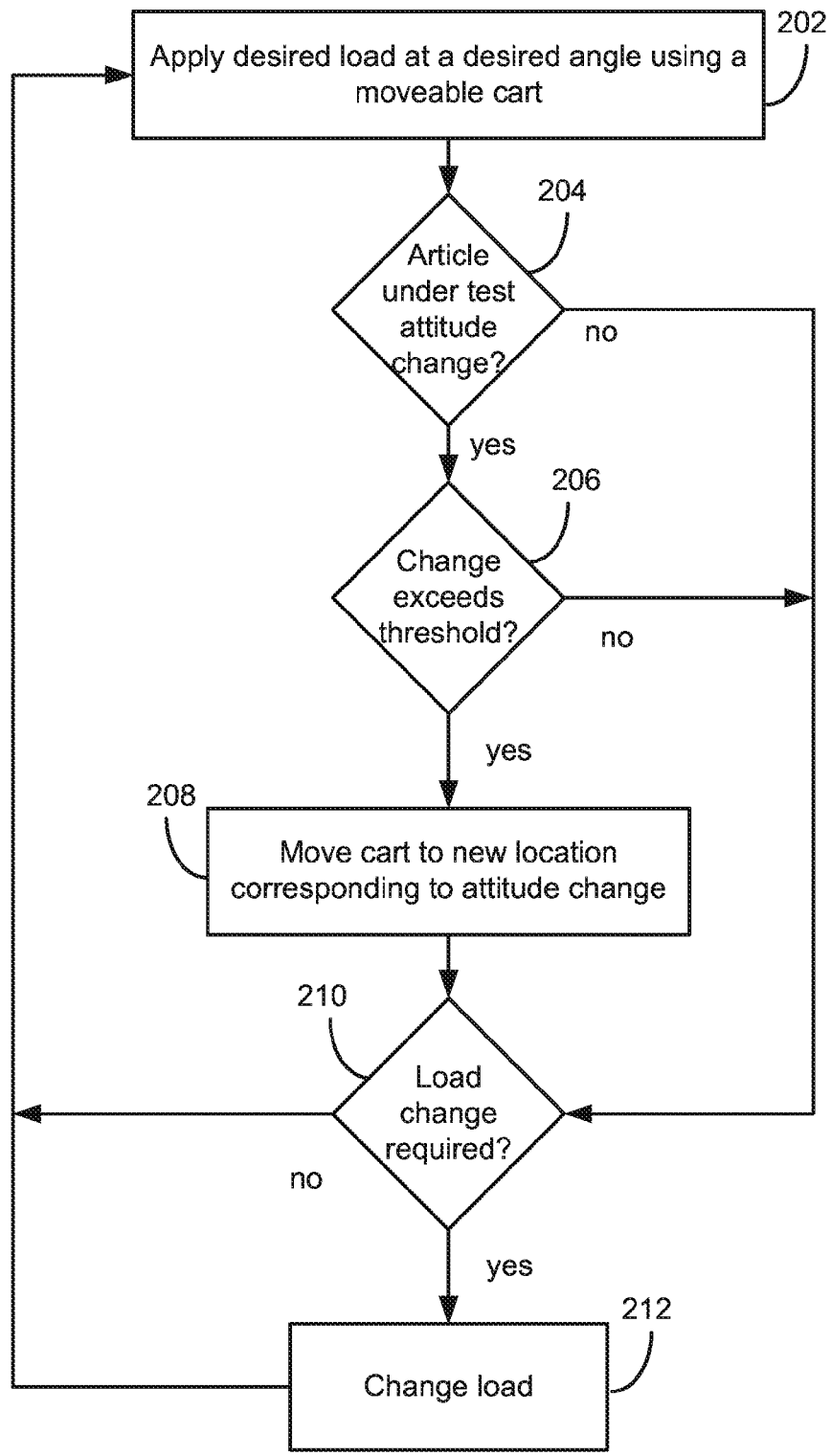
FIG. 12 is an illustration of operations performed by one embodiment a test rig operating to perform a test in accordance with the current disclosure.

A method 200 of providing a load to an article under test 110 is illustrated in the flowchart of FIG. 12. At block 202, a moveable cart 108 is used to apply a load at a desired angle. In different embodiments, an actual angle 116 is determined by comparing a location of the cart 108 with the article under test 110, while in other embodiments, the actual angle 116 is determined by a measurement, such as an optical measurement.

At block 204, a change in an attitude of the article under test may be determined. The change in angle 116 can be calculated using knowledge of an updated attitude of the article under test 110 from sensor data and knowledge of location of the cart 108. Alternatively, the change in angle 116 can be determined programmatically based on knowledge of the test sequence 166, as discussed above. When no movement has occurred, the 'no' branch is be taken to block 210. When movement has occurred, the 'yes' branch is be taken to block 206.

Optionally, at block 206 a decision may be made as to whether the change causes angle 116 to exceed a threshold value for deviation from a desired angle. For example, in one embodiment, the desired angle is 105 degrees, plus or minus 5 degrees. If the change in attitude of the article under test 110 causes the angle 116 to fall outside that range, the 'yes' branch is be taken to block 208. In other embodiments, the check for a threshold value may not be performed and measurable movement of the article under test 110 may prompt a change in location of the cart 108.

At block 208, the cart 108 may be moved to a new location, responsive to instructions from the controller 151 in order to maintain the angle 116 of the load within the desired range. Execution, in this embodiment, continues at block 210, which may also be accessed by the 'no' branch from block 206. At block 210, a determination is made if a change in load is required. In an embodiment, the test sequence may call for a change in a magnitude of the load even if the article under test 110 has not moved. Additionally, as discussed above, even if the desired load is unchanged, a change in location of the cart 108 may affect the load being delivered and an adjustment may be required. If a load change is required, the change is be made at block 212 and execution continued at the top of the loop, block 202.

The ability to maintain a vector load, that is both a desired angle and a desired magnitude of a load relative to a moving structure is a benefit to designers, testers, and regulators. Testing structures, particularly airframe components, in real time as the structures move following actual use patterns provides more accurate data about predicted operation and represents a significant reduction in test time over manually placed loads at discrete attitudes of structures being tested. Because the test is performed in real time over the continuous range of motion of the article under test 110, the need to interpolate data between discrete test points is eliminated. Further, the support structures and actuators coupled to the article under test 110 are also tested under more realistic operating conditions compared to a series of static tests.

While only certain embodiments have been set forth, alternatives and modifications will be apparent from the above description to those skilled in the art. In particular, aspects of the different embodiments can be combined with or substituted by one another. These and other alternatives are considered equivalents and within the spirit and scope of this disclosure and the appended claims.

What is claimed:

1. A test rig for use with an article under test, the article under test having a surface movable about an axis of rotation, the test rig comprising:
   a cart movable in a plane perpendicular to the axis of rotation of the movable surface of the article under test;
   a load mechanism coupled to the cart that provides a load that is programmatically adjustable and applied to the surface of the article under test as the surface moves about the axis of rotation; and
   a controller that coordinates in real time motion of the cart with movement of the surface of the article under test to maintain a desired load angle between the load mechanism and the surface of the article under test as the surface moves about the axis of rotation.

2. The test rig of claim 1, further comprising a track that guides the motion of the cart, a longitudinal direction of the track positioned normal to the axis of rotation.

3. The test rig of claim 2, wherein the track includes a rack and the cart includes a pinion drive engaged to the rack to move the cart along the track responsive to instructions from the controller.

4. The test rig of claim 3, wherein the cart includes a linear table that moves the load mechanism perpendicular to the longitudinal direction of the track responsive to instructions from the controller.

5. The test rig of claim 2, further comprising a second cart coupled to the track, the second cart providing a second load that is programmatically adjustable and applied to the article under test.

6. The test rig of claim 2, wherein a shape of the track is an arc of a circle.

7. The test rig of claim 2, further comprising a support stand that holds the track.

8. The test rig of claim 7, wherein the support stand translates laterally, perpendicular to the longitudinal direction of the track.

9. The test rig of claim 1, wherein the controller dynamically adjusts the load via the load mechanism as the cart is moved in relation to the article under test.

10. The test rig of claim 1, wherein the load mechanism is a cable and an adjustable tensioner coupled to the cable.

11. The test rig of claim 1, wherein the load mechanism is a rod and a compression device wherein the compression device is at least one of a hydraulic cylinder or a motor.

12. A test rig that provides a load to a movable surface of an article under test, the movable surface being movable about an axis of rotation, the test rig comprising:
    a track having a longitudinal direction perpendicular to the axis of rotation of the movable surface of the article under test;
    a cart that is moveable along the track;
    a load mechanism coupled to the cart and engaging the movable surface of the article under test, the load mechanism responsive to instructions to provide the load to the movable surface of the article under test;
    a drive mechanism that moves the cart along the track, the cart responsive to instructions to move the cart; and
    a controller that determines an attitude of the movable surface of the article under test as the movable surface moves about the axis of rotation and sends instructions to the load mechanism and the drive mechanism to adjust the load and to move the cart, respectively.

13. The test rig of claim 12, wherein the track translates parallel to the axis of rotation to set a first angle between the load mechanism and the movable surface of the article under test.

14. The test rig of claim 12, wherein the shape of the track defining the distance from the cart to the article under test is determined by the motion of the movable surface of the article under test.

15. A test rig comprising:
- a cart that moves in relation to an article under test;
- a load mechanism coupled to the cart that provides a load that is programmatically adjustable and applied to the article under test;
- a controller that coordinates in real time motion of the cart with movement of the article under test to maintain a desired load angle between the load mechanism and the article under test; and
- a sensor that reports to the controller a measurement corresponding to an actual angle between the load mechanism and the article under test.

16. The test rig of claim 15, wherein the measurement is at least one of an angle of the article under test or an attitude of the article under test.

* * * * *